(12) United States Patent
Sellin et al.

(10) Patent No.: US 8,115,455 B2
(45) Date of Patent: Feb. 14, 2012

(54) POWER BATTERY MODULE, BATTERY, MODULE CHARGING METHOD, VEHICLE HAVING THE BATTERY

(75) Inventors: Christian Sellin, Concarneau (FR); Jean-Luc Monfort, Quimper (FR); Luc Nedelec, L'hopital Camfrout (FR)

(73) Assignee: Batscap, Gaberic (FR)

( * ) Notice: Subject to any disclaimer, the term of this patent is extended or adjusted under 35 U.S.C. 154(b) by 434 days.

(21) Appl. No.: 12/526,020

(22) PCT Filed: Feb. 1, 2008

(86) PCT No.: PCT/EP2008/051291
§ 371 (c)(1),
(2), (4) Date: Aug. 5, 2009

(87) PCT Pub. No.: WO2008/101789
PCT Pub. Date: Aug. 28, 2008

(65) Prior Publication Data
US 2010/0090659 A1 Apr. 15, 2010

(30) Foreign Application Priority Data
Feb. 6, 2007 (FR) ...................................... 07 00825

(51) Int. Cl.
*H02J 7/04* (2006.01)
(52) U.S. Cl. .......................... 320/152; 320/107; 320/150
(58) Field of Classification Search .................. 320/152, 320/107
See application file for complete search history.

(56) References Cited

U.S. PATENT DOCUMENTS

| | | | |
|---|---|---|---|
| 4,303,748 A | 12/1981 | Armand et al. | |
| 4,542,081 A | 9/1985 | Armand et al. | |
| 5,021,308 A | 6/1991 | Armand et al. | |
| 5,204,611 A | 4/1993 | Nor et al. | |
| 5,250,784 A | 10/1993 | Muller et al. | |
| 5,302,810 A | 4/1994 | Gauthier et al. | |
| 5,773,962 A | 6/1998 | Nor | |
| 6,025,695 A | 2/2000 | Friel et al. | |
| 7,059,769 B1 * | 6/2006 | Potega | 374/185 |
| 2005/0077878 A1 | 4/2005 | Carrier et al. | |
| 2006/0028182 A1 | 2/2006 | Yang et al. | |
| 2006/0028183 A1 | 2/2006 | Izawa et al. | |
| 2006/0123622 A1 | 6/2006 | Guy | |
| 2006/0193095 A1 | 8/2006 | Hunter et al. | |
| 2006/0263688 A1 | 11/2006 | Guyomard et al. | |
| 2007/0169338 A1 | 7/2007 | Descamps | |
| 2008/0076025 A1 | 3/2008 | Guyomard et al. | |

FOREIGN PATENT DOCUMENTS

DE 196 14 435 4/2006

(Continued)

*Primary Examiner* — M'Baye Diao
(74) *Attorney, Agent, or Firm* — Harness, Dickey & Pierce, P.L.C.

(57) ABSTRACT

The application relates to a power battery module, including rechargeable cells having a nominal operating charging temperature, greater than 20° C. According to the application, the module includes a circuit for managing charging of the cells which further includes:
  two external charging terminals for charging of the cells, wherein at least one, called second charging terminal, of the two external charging terminals is distinct from the external use terminals,
  first interruption/connector between the second charging terminal and one of the use terminals,
  second device between the charging terminals and the heating element to connect, at least in the first interruption position, the charging terminals to a heating element of the cells.

38 Claims, 7 Drawing Sheets

FOREIGN PATENT DOCUMENTS

| | | |
|---|---|---|
| EP | 1 363 343 | 5/2002 |
| EP | 1 302 998 | 4/2003 |
| EP | 0 998 778 | 4/2004 |
| EP | 1581978 | 8/2008 |
| FR | 2849280 | 6/2004 |
| WO | WO 99/05746 | 2/1999 |
| WO | WO99/31752 | 6/1999 |
| WO | WO0193398 | 12/2001 |
| WO | WO 02/097456 | 12/2002 |
| WO | WO 02/097946 | 12/2002 |
| WO | WO 03/015196 | 2/2003 |
| WO | WO2004059776 | 7/2004 |
| WO | WO2004059777 | 7/2004 |
| WO | WO 2006/007687 | 1/2006 |

* cited by examiner

POWER BATTERY MODULE, BATTERY, MODULE CHARGING METHOD, VEHICLE HAVING THE BATTERY

CROSS-REFERENCE TO RELATED APPLICATIONS

This application is a National Phase Entry of International Application No. PCT/EP2008/051291, filed on Feb. 1, 2008, which claims priority to French patent application Ser. No. 07/00825, filed on Feb. 6, 2007, both of which are incorporated by reference herein.

BACKGROUND AND SUMMARY

The invention relates to a battery module having rechargeable cells having a nominal operating temperature greater than 20° C.

A field of application of the invention is power batteries, such as for example those acting as power source for driving a traction motor drive in electric vehicles. The battery module can of course have other applications, for example powering fixed equipment. These applications to power batteries utilise for example lithium-metal-polymer technology cells.

One of the aims of power batteries is to have the greatest possible energy density. Therefore, lithium-metal-polymer cells made by assembling films enable to obtain energy specific and volumic densities, greater respectively than 100 W·h/kg and 100 W·h/l. Another aim of the power battery industry is to produce battery modules having a long life, given that a long life is a factor for competing with combustion engines in applications to motor vehicles.

In general, the cells concerned by the invention are of the type needing to be heated to their nominal operating temperature by a heating element. In a module, the cells are branched between two external connection terminals. A battery is for example formed from several modules having their connection terminals connected in series.

Cells can be in three states: charge, discharge or regeneration. Cells can be charged by being connected to an adapted external charger. The state of discharge corresponds to the electric current feed to a power consuming device from the cells.

The regeneration state corresponds to the situation in which the power consuming device recharges the cells, such as for example in the case of an electric vehicle when braking, in which an electric regeneration current is supplied from the traction motor drive to the cells of the battery. To preserve the lifetime of the modules and of the battery, respect for certain conditions of use when charging is needed. In fact, due to the fact of large power densities, a very high current charge circulates between the entity forming the charger and the battery module or the battery. Charging the battery or the battery module at a too low temperature substantially favours formation of dendrites in the cells, causing their lifetime to be shortened.

Document WO 99/31 752 describes a battery control system, serving as emergency feed for equipment, such as a computer or telecommunications equipment, normally fed by an electricity distribution network rectifier. Via this control system, the battery is charged from the network rectifier and, in case of disruption to the supply network, is discharged in the equipment. The system comprises a rest mode, in which the voltage of the network rectifier is detected to then pass to cold mode. In cold mode, the system utilises the current supplied by the network rectifier to heat the cells of the battery to a temperature of 60° C. Once this temperature of 60° C. is reached, the system switches to charge mode, in which an interrupter placed between the terminals of the battery and the cells is closed to charge the battery from the network rectifier.

It is understood therefore that most of the time, that is, in the absence of breakdown, such a system is not in discharge, but is always connected to a charging entity. The disadvantage of this system is not to be able to do without an external supply system connected permanently to the battery as entity charging the battery. This system is utilised occasionally in the charge and discharge cycle, that is much less than 1% of the time, and not intensively in charge and in discharge. On the contrary, when the battery is used as the sole and autonomous supply for equipment such as a motor vehicle, the battery modules are subjected to a greater number of constraints due to the larger proportion of charge and discharge cycles, greater than 20% of the time.

This system according to document WO 99/31 752 is therefore poorly suited to use of the battery as the sole and autonomous supply of an equipment such as for example a motor vehicle. Due to its topology this system according to document WO 99/31 752 is not appropriate for placing several battery modules in series.

The aim of the invention is to provide a battery module and a battery which are appropriate for applications where the battery module or the battery is not connected permanently to a charging entity but on the contrary must have substantial discharge autonomy on consumer equipment, which allow control of the process for heating and charging the cells, preservation of the lifetime of the battery module or of the battery, and to keep significant power density in intensive use. To this end, a first subject matter of the invention is a power battery module, comprising a multiplicity of rechargeable cells having a nominal operating charging temperature, greater than 20° C., two external use terminals for using the cells and at least one electric element for heating of the cells, characterised in that it further comprises a circuit for managing charging of the cells, which comprises:

two external charging terminals for charging of the cells, wherein said two external charging terminals are intended to be connected to an external charger, wherein at least one, called second charging terminal, of the two external charging terminals is distinct from the two external use terminals, first interruption/connection means between said at least one second charging terminal and at least one of the use terminals, called first use terminal, the first interruption/connection means being able to be in one or the other of a first interruption position to prevent the flow of current between the second charging terminal and the first use terminal, and of a second connection position for connecting the second charging terminal and the first use terminal, second linking means between the charging terminals and the heating element to connect, at least in the first interruption position of the first interruption/connection means, the charging terminals to the heating element to supply the heating element with electricity.

For example, the two charging terminals are second charging terminals, distinct from the use terminals, called first use terminals, the first interruption/connection means being provided between the second terminals and the first terminals.

Embodiments of the invention are provided to especially resolve the problems associated with placing several modules in series by their use terminals. In fact, one aim is to provide a battery module which is easy to use and especially can be utilised non-autodestructively in the case of such connecting in series, required for sole and autonomous feed of equipment such as for example a motor vehicle. In this case major technical constraints occur, due to high voltages (several hundreds of volts), which are potentially destructive to the interrupters used in each module.

According to embodiments of the invention:

The second linking means comprise at least one heating interrupter, having an opening and closing control input, in series with the heating element, this series circuit being connected between the charging terminals, the control input being connected to opening activation means comprising a control input for putting the heating interrupter in an opening position in the presence of an opening control signal on said control input, third means being provided in the module so that closing of the heating interrupter is independent from the opening activation means and from the control input;

The second linking means comprise at least one heating interrupter, having an opening and closing control input, in series with the heating element, this series circuit being connected between the charging terminals, the control input being connected to third means for automatic closing activation of the heating interrupter in the presence of voltage between the charging terminals, and to opening activation means comprising a control input for putting the heating interrupter in an opening position in the presence of an opening control signal on said control input;

The control input of the opening activation means is opto-insulated relative to the control input of the heating interrupter;

Or the opening activation means comprise an interrupter, having a principal current interruption/conduction path which is connected in parallel to the series circuit formed by the heating interrupter and the interruption means and having a control terminal serving as opening control input;

The second linking means comprise in series with the heating element at least one heating interrupter, having an opening and closing control input, this series circuit being connected between the charging terminals, the control input of the heating interrupter being connected to voltage limitation means;

The third means comprise elements for biasing of the control input from the charging terminals;

The voltage limitation means comprise at least one Zener diode;

The heating interrupter comprises at least one transistor, having a principal current interruption/conduction path which is in series with the heating element and having a control terminal for controlling the principal path and serving as control input;

The transistor of the heating interrupter is a MOS transistor, having a drain-source section which forms the principal current interruption/conduction path and having a gate serving as control input;

The Zener diode is in parallel with the gate-source section of the MOS transistor of the heating interrupter;

The second linking means comprise, in series with the heating element between the charging terminals, at least one thermal fuse protecting against temperatures exceeding a preset temperature greater than the nominal operating charging temperature of the cells;

It comprises at least one unit for measuring the temperature in at least one zone of the module, and control means for controlling of the position of the first interruption/connection means, said control means being sensitive to the temperature measured by the measuring unit in order to operate the first interruption/connection means into the connection position, when the minimal temperature provided by the measuring unit is greater than or equal to the nominal operating charging temperature preset to said control means;

The second linking means comprise at least one heating interrupter, having an opening and closing control input, in series with the heating element, this series circuit being connected between the charging terminals, the module comprising control means connected to the control input for opening the heating interrupter only when the first interruption/connection means is in the connection position;

The heating element is respectively associated with the temperature-measuring unit in said zone of the module, and the control means are provided to cause, when of the first interruption/connection means is in the connection position, the heating interrupter to open when the measured temperature of the associated unit becomes greater than a first preset temperature, greater than the nominal operating charging temperature, and to cause the heating interrupter to close when the measured temperature of the associated unit becomes less than a second preset temperature, less than the nominal operating charging temperature and greater than 20° C.;

A temperature-measuring unit is provided in at least two different zones of the module;

The cells are made by assemblies of thin films;

The cells have a nominal operating charging temperature, greater than 80° C.;

The cells are of lithium-metal-polymer type;

It comprises means for producing of a quantitative charging setpoint and a first access for communication to the outside, able to transmit the quantitative charging setpoint.

A second subject matter of the invention is a battery, characterised in that it comprises a plurality of battery modules as described above in a battery case, the modules being connected by their use terminals in the case, the battery comprising at least two use terminals, accessible outside the case and connected to the modules, and at least two charging terminals, accessible outside the case and connected to the modules.

According to other features of the invention:

The use terminals of the modules are connected successively in series in the case, one of the external use terminals is connected to the use terminal of the lowest voltage of all the modules and the other external use terminal of the battery is connected to the use terminal of the highest voltage of all the modules;

The charging terminals of each module are accessible outside the case;

The modules are connected by their charging terminals in the case, the battery comprising two charging terminals, accessible outside the case and connected to the modules;

The charging terminals of the modules are connected successively in series in the case, one of the external charging terminals is connected to the charging terminal of the lowest voltage of all the modules and the other external charging terminal of the battery is connected to the charging terminal of the highest voltage of all the modules;

The battery comprises means for producing of a quantitative charging setpoint of the modules and a first access for communication to the outside, able to transmit the quantitative charging setpoint.

A third subject matter of the invention is a method for charging a battery module as described above from an external charger, characterised in that the at least one second external charging terminal is first disconnected relative to the at least one first external use terminal distinct from the at least one second external charging terminal, the charger is connected to the external charging terminals to apply voltage to it, the heating element is connected to the external charging terminals to heat the cells of the module from the voltage of the charger at least to the nominal operating charging temperature during an initial heating phase, and after the initial heating phase, the at least one first external use terminal is connected to the at least one second external charging terminal to charge the cells from the voltage of the charger.

According to other features of the invention:

The two charging terminals are second charging terminals, distinct from the use terminals, called first use terminals, before and during the initial heating phase, the two charging terminals are disconnected relative to the use terminals, until the cells are heated to their nominal operating charging temperature, after the initial heating phase, the cells are charged from the voltage of the charger from the second charging terminals, by connecting the charging terminals to the use terminals;

At least one measuring unit provided in at least one zone of the module measures the temperature, a calculator of the module, connected to the measuring unit monitors the measured temperature of the cells and cause the connection of the at least one first external use terminal to the at least one second external charging terminal when the minimal measured temperature is greater than or equal to the nominal operating charging temperature;

At least one heating interrupter, comprising an opening and closing control input, is in series with the heating element, this series circuit being connected between the two external charging terminals, the heating interrupter is automatically closed in the presence of the voltage of the charger on the external charging terminals during the initial heating phase, a calculator of the module controls the control input to at least temporarily cause opening of the heating interrupter only when the charging terminals are connected to the use terminals;

The heating element is respectively associated with the temperature-measuring unit in said zone of the module, and when the charging terminals are connected to the use terminals, the calculator controls the control input to cause opening of the heating interrupter when the measured temperature of the associated unit becomes greater than a first preset temperature, greater than the nominal operating charging temperature, and to cause the closing of the heating interrupter when the measured temperature of the associated unit becomes less than a second preset temperature, less than the nominal operating charging temperature and greater than 20° C.;

A temperature-measuring unit is provided in at least two different zones of the module;

The battery module is housed in a motor vehicle.

A fourth subject matter of the invention is a motor vehicle, comprising a traction motor drive and at least one battery as described above, for at least temporarily supplying the traction motor drive with electric power.

BRIEF DESCRIPTION OF DRAWINGS

The invention will be better understood from the following description, given solely by way of non-limiting example in reference to the attached diagrams, in which.

DETAILED DESCRIPTION

The invention is described hereinbelow in reference to the embodiment represented in the figures, in which the cells are made by assembling films, for example made of lithium-metal-polymer. The total thickness of these films is for example less than 300 micrometers and for example around 150 micrometers. The cells have a nominal operating charging temperature greater than 20° C., and, for lithium-metal-polymer technology, a nominal operating charging temperature of 90° C.

Figure 1:
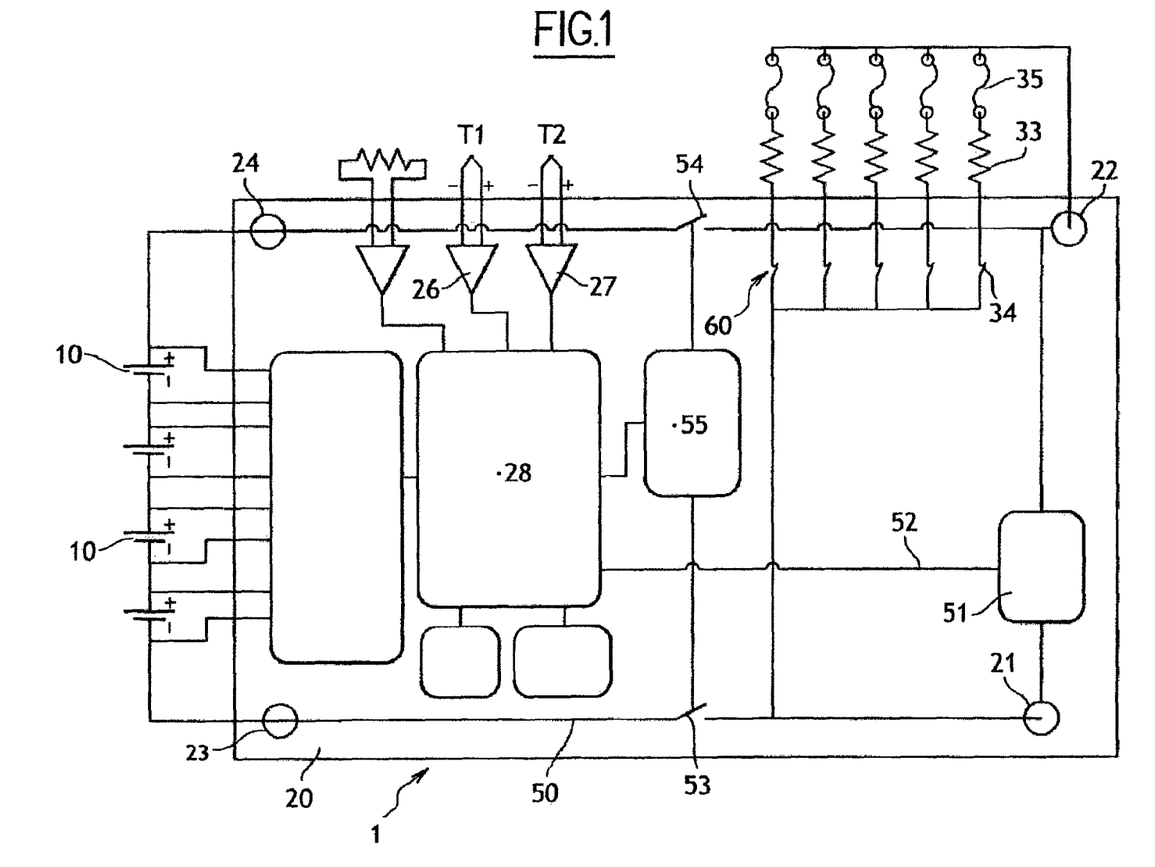
FIG. 1 schematically illustrates a battery module according to the invention.

In FIG. 1, a battery module 1 comprises, between two first external connection and use terminals 23, 24, a number m of identical cells 10 in series, rechargeable and dischargeable, as well as a control unit 20 for control of its own cells 10. This control unit 20 is for example in the form of a printed circuit electronic card.

Figure 3:
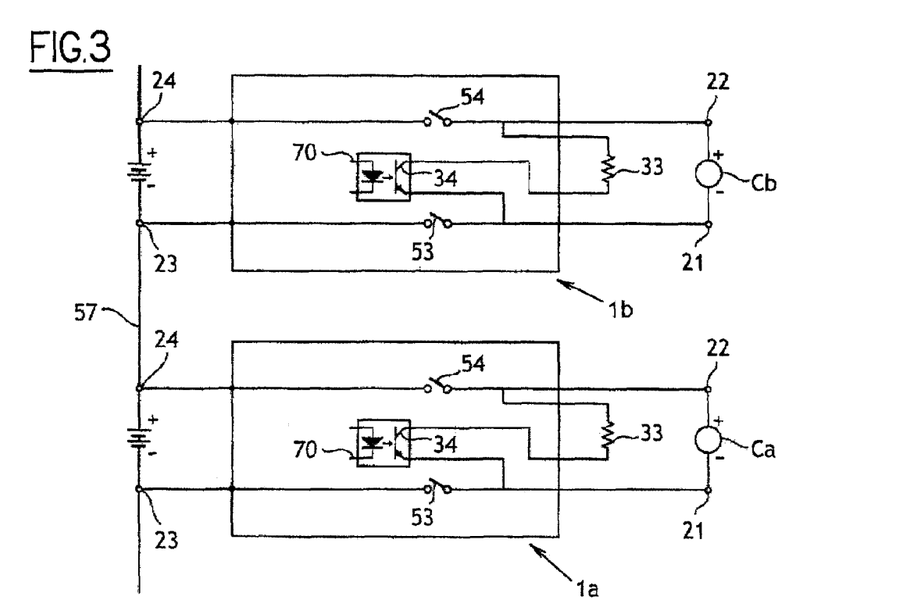
FIG. 3 schematically illustrates a charging example of two modules according to FIG. 1 in series from two chargers.
Figure 4:
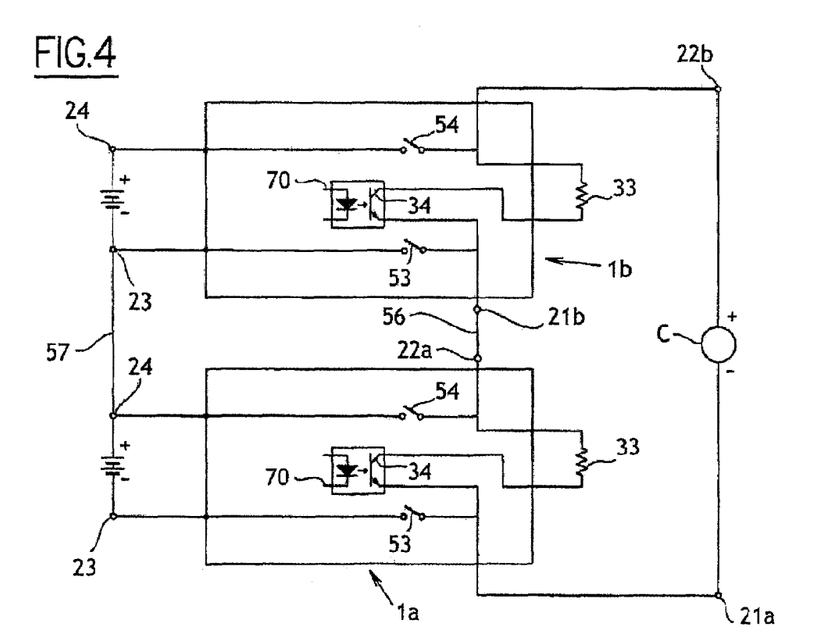
FIG. 4 schematically illustrates a charging example of two modules according to FIG. 1 in series from a single charger.
Figure 5:
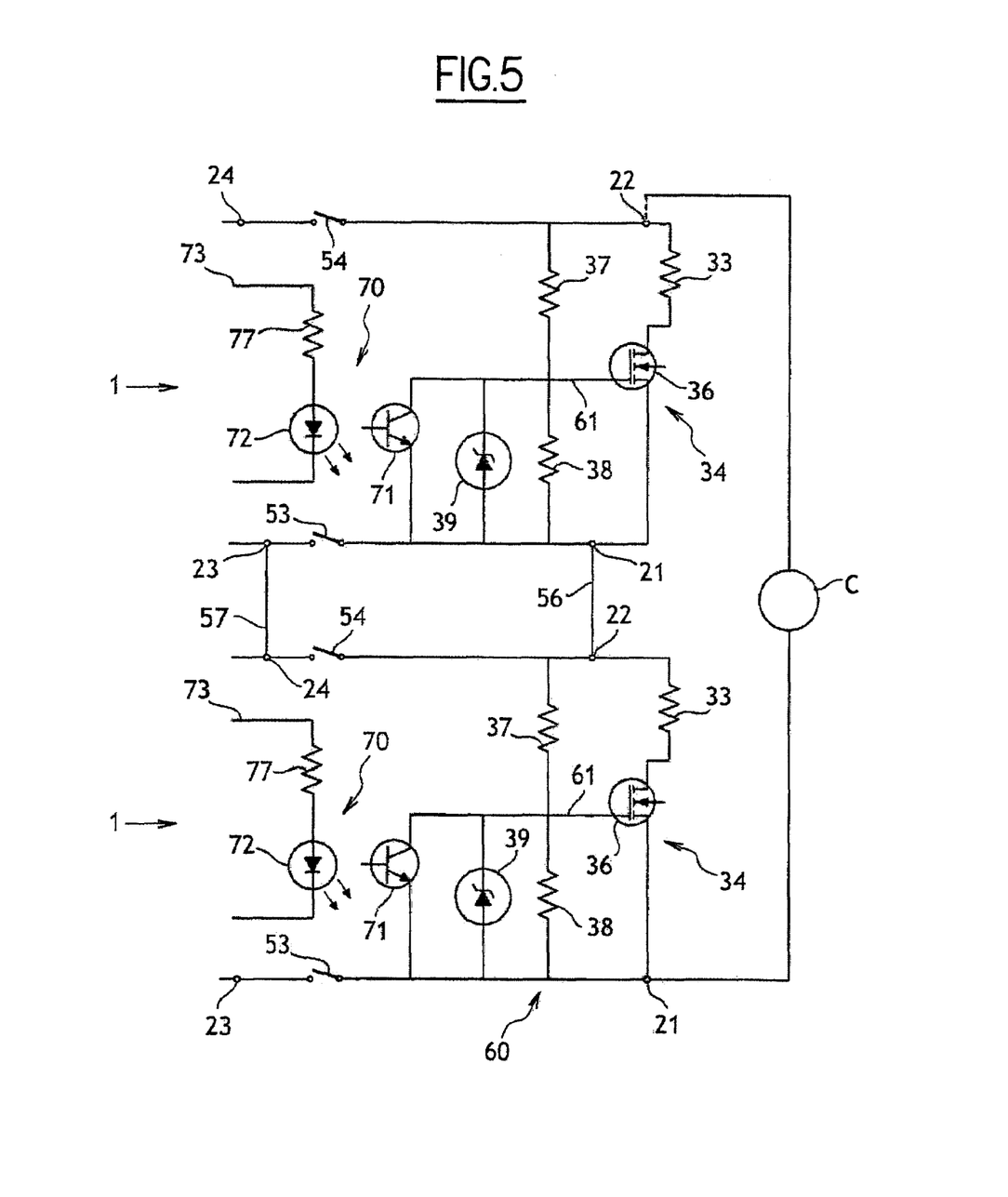
FIG. 5 schematically illustrates an embodiment of the heating circuit of a module according to FIG. 1.

A battery can be constituted by one or more modules in series by their terminals 23, 24. For placing n modules in series, as is shown in FIGS. 3, 4 and 5, the high voltage terminal 24 of a module is connected by a power conductor 57, such as for example a metal bar of sufficiently large transversal cross-section, to the low-voltage terminal 23 of the following module, the battery comprising two external terminals, whereof one is connected to the lowest voltage terminal 23 of all the modules, and whereof the other is connected to the highest voltage terminal 24 of all the modules, these two external terminals being intended to be connected to two terminals of a consumer equipment to supply it with electric current. For example, $1 \leq n \leq 15$. Of course, in other embodiments not illustrated, some of the modules could be placed in parallel.

The unit 20 of the module 1 comprises charging and heating terminals 21, 22, intended to be connected to an external charger. The charging terminals 21, 22 are distinct from the connection terminals 23, 24 connecting to the cells. A circuit 50 for managing charging of the cells 10 is interposed between the connection terminals 23, 24 and the charging terminals 21, 22. By the terminals 23, 24 connected to the two ends of the associated cells 10 in series flow the current charge arriving at the cells, and, when the module 1 is connected to a consumer device, the discharge current coming from the cells 10 and the regeneration current arriving at the cells 10. Of course, in an embodiment not illustrated here, the external connection terminals 23, 24 could be physically distinct from terminals for sending the current charge from the charging management circuit, these sending terminals being connected electrically to the cells and to the external connection terminals 23, 24.

The terminals 21, 22 are connected to a module 51 for detection of the presence of the external charger, the module 51 having an output 52 supplying a first information signal in the absence of application of charging voltage to the terminals 21, 22, and a second charging detection signal in the event of application of charging voltage to the terminals 21, 22. Provided likewise between the terminals 21, 22 are one or more heating elements 33 for heating of the cells 10 by electrical resistor, connected in parallel to the terminals 21, 22 by linking means 60 which will be described hereinbelow. These elements 33 are for example formed by heating plates. In the embodiment shown in FIG. 2, heating plates 33 are provided in at least first and second different heating zones Z1, Z2 in the module 1, specifically for example in the zone Z1 of the walls of the module, by two plates Pch4 and Pch5 in FIG. 2, and in the central zone Z2 of the module, by two or three heating plates Pch1, Pch2 and Pch3.

Interruption means 53, 54 are provided between on the one hand the terminals 23, 24 situated towards the cells 10 and on the other hand the terminals 21, 22 situated towards the charger and the heating elements 33. The interruption means 53, 54 are therefore interposed between the means 60 linking to the heating elements 33 and the terminals 23, 24 giving access to the cells, and are able to interrupt the flow of the charging current from the terminals 21, 22 to the terminals 23, 24 and the cells 10. These interruption means 53, 54 are capable of being closed to make a current flow in both directions between the terminals 21, 22 and the terminals 23, 24. In FIG. 1 they comprise an interrupter 53 between the terminal 21 and the terminal 23, and another interrupter 54 between the terminal 22 and the terminal 24. The interrupters 53, 54 have a closing position supporting the flow of a charge current from the terminals 21, 22 to the terminals 23, 24. They are formed for example by mechanical relays directly implanted on the printed circuit of the electronic card.

In an embodiment not shown, one of the interrupters 53 and 54 is omitted and replaced by an electric connection between a use terminal 23 or 24 and a charging terminal 21 or 22, and interruption means 54 or 53 are provided between the other use terminal 24 or 23 and the discharge terminal 22 or 21. The electric connection can likewise mean that the external use terminal 23 is the external charging terminal 21, or that the external use terminal 24 is the external charging terminal 22.

Control means are provided to put the interruption means 53, 54 in one and the other of their closing and interruption positions. In the embodiment of FIG. 1, these control means comprise a calculator 28 connected to an actuator 55 for actuating of the interrupters 53 and 54. The calculator 28 is connected to one or more units 26, 27 measuring the temperature of the cells 10, as well as to the output 52 of the module 51 for detecting the presence of the external charger. For example, the unit 26 serves to measure the temperature T1 in the zone Z1 and the unit 27 serves to measure the temperature T2 in the zone Z2.

In the case of a battery comprising several modules 1 in series, one charger per module can be provided, as is shown in FIG. 3, or a common charger for all the modules, as is shown in FIG. 4. In FIG. 3, each module 1a, 1b comprises its own charging terminals 21, 22, which are independent from the charging terminals 21, 22 of the other modules of the battery and which are accessible from the exterior by any appropriate means to be connected to the respective charging terminals Ca, Cb.

In FIG. 4, the charging terminals 21, 22 of the modules 1 are connected in series via conductors 56. The high-voltage terminal 22a of a module 1a is connected by a conductor 56 to the low-voltage terminal 21b of the module according to 1b, the battery comprising two external charging terminals, one of which is connected to the lowest voltage terminal 21a of all the modules, and whereof the other is connected to the highest voltage terminal 22b of all the modules, these two external charging terminals being accessible from the exterior by any means appropriate to be connected to the terminals of the common charger C.

Figure 9:
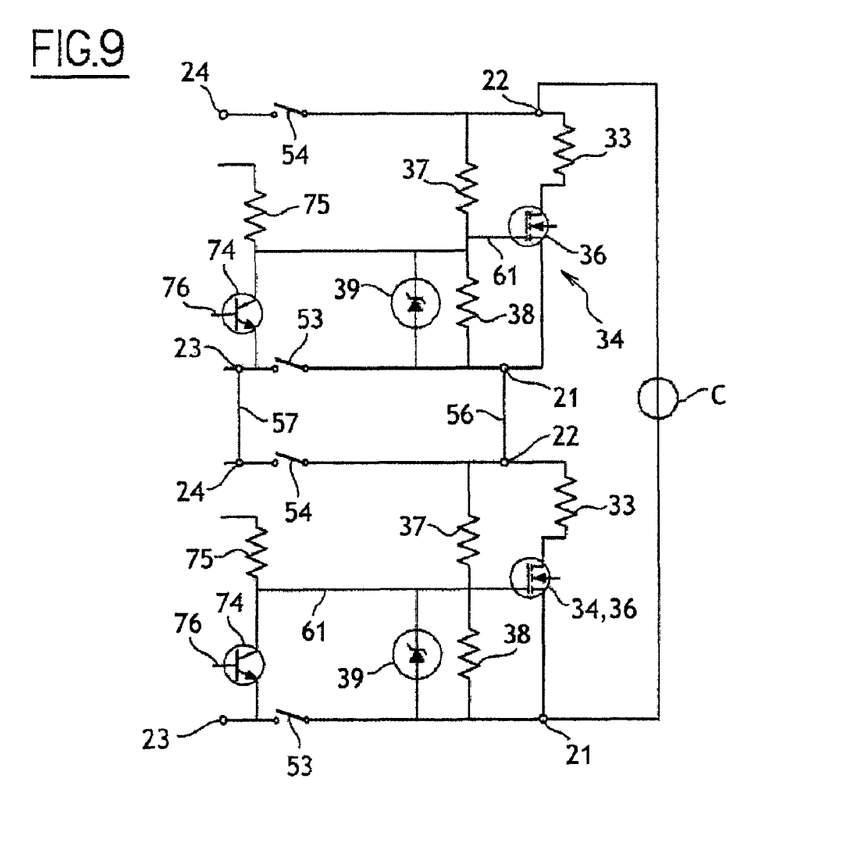
FIG. 9 schematically illustrates a variant of the embodiment of the heating circuit of a module according to FIG. 5.

In reference to FIGS. 1, 2, 5 and 9 hereinbelow embodiments of the means 60 linking the heating elements 33 to the charging terminals 21, 22 in a module 1 are described. In FIGS. 5 and 9, these embodiments are illustrated for two modules 1 in series, without showing the protective fuses 35. The linking means 60 comprise for each heating element 33 a protective fuse 35 and a heating interrupter 34 in series with the element 33 in a branch for the flow of the heating current, this branch being connected by one end to the charging terminal 21 and by the other end to the other charging terminal 22. Closing activation means are provided on a control input 61 of the heating interrupter 34 so that it is automatically closed in the presence of a voltage between the charging terminals 21, 22 for the heating current to flow to the associated element 33. Opening activation means are provided so that the heating interrupter 34 is opened when an opening-triggering signal is applied to the control input 61 thereof.

In FIGS. 5 and 9, each heating interrupter 34 is formed for example by an enhancement MOS transistor 36, having a drain-source section which is in series with the heating element 33 for flow of the heating current. A bias resistor 37 connects the gate 61 of the transistor 36 to the charging terminal 22, while another bias resistor 38 connects the gate 61 of the transistor 36 to the charging terminal 21, to form a voltage-dividing circuit. In the presence of the voltage of the charger between the charging terminals 21, 22, the transistor 36 conducts automatically, the automatic closing activation means then being formed by the bias resistors 37, 38. Of course, any other type of transistor 36 could be provided to form the heating interrupter 34, with the principal interruption/conduction path (drain-source or collector-sender for example) in series with the heating element 33.

Also, means for of voltage-limitation of the control input 61 of the interrupter 34 are provided. In the embodiment of FIGS. 5 and 9, these voltage-limitation means are formed by a Zener diode 39 connected in parallel to the bias resistor of the gate-source control section of the transistor 36. In the case of FIG. 5, where the transistor 36 is of type MOS with N-type channel, having its drain connected to the heating element 33 and its source connected to the charging terminal 21, the Zener diode 39 is connected in parallel to the resistor 38, by having its cathode connected to the gate 61 of the transistor 36 and its anode connected to the terminal 21. Of course, the transistor 36 could likewise be of type MOS with type-P enhancement, or P or N-type depletion, as in FIG. 2.

Figure 6:
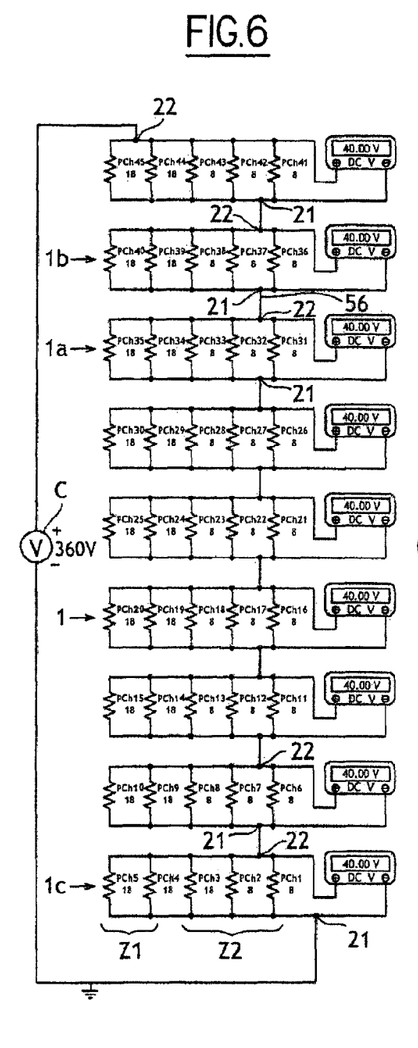
FIG. 6 schematically illustrates an embodiment of a battery having several modules 1 in series, charged from a single charger, with indication of voltages of the heating elements.

The risks of destruction to the heating interrupters 34, which could arise in the case where, while the interruption means 53, 54 are open, several modules 1 in series are fed with charging voltage by a single charger C on their charging terminals 21, 22 connected in series, are consequently solved. FIG. 6 shows such a battery example, corresponding in FIG. 4, comprising nine identical modules 1 in series, whereof only the PCh heating elements are shown. Each module has in parallel two heating elements PCh, each having an 18-Ohm resistor (for example those of wall zone Z1) and three heating elements PCh, each having an 8-Ohm resistor (for example those of the central zone Z2). The common charger C applies total voltage of 360 volts to the end terminals 21, 22 of the nine modules 1. Each module 1 therefore receives at its own terminals 21, 22 voltage of 40 volts, as symbolised by the indication of the voltmeter on each module.

Figure 7:
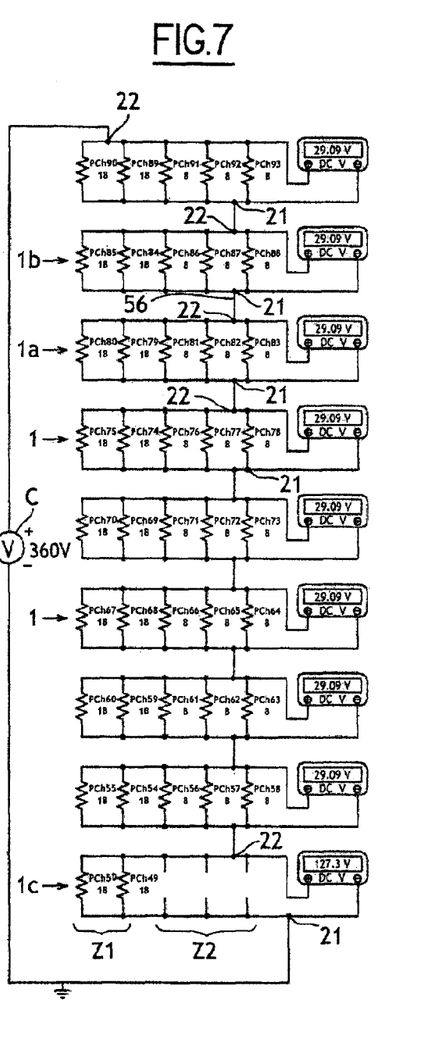
FIG. 7 corresponds to FIG. 6, in the case of partial inactivation of the heating elements of one of the modules.

In the case where one of the heating elements 33 is deactivated by opening its heating interrupter 34, it lowers the global heating resistor between its charging terminals 21, 22 and therefore increases the voltage received by its other heating elements 33. FIG. 7 illustrates this case where, in the module 1c, the interrupters 34 in series with the three heating elements of 8 Ohms resistance are open, thus preventing flow of current in these elements, as is symbolised by the voids between the terminals 21, 22 of the module. A voltage of 127.3 V then appears at the terminals 21, 22 of this module 1c and a voltage of 29.09 V at the terminals 21, 22 of the other modules 1. This case is potentially destructive to the heating interrupters 34 of the module 1c for excessive voltage.

Figure 2:
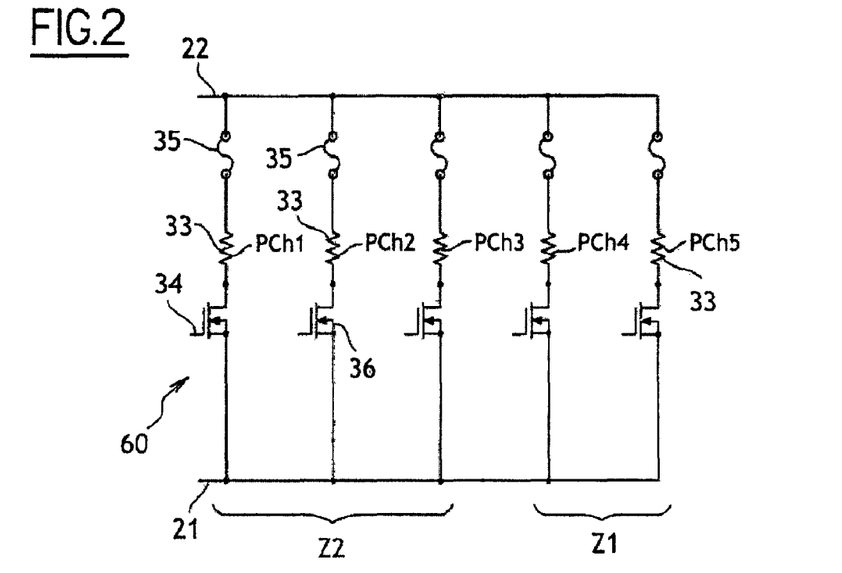
FIG. 2 schematically illustrates a heating circuit of the cells of the module according to FIG. 1.

In FIGS. 5 and 9, when the voltage between the charging terminals 21, 22 of the module increases, the voltage between the gate and the source of the transistor 36 increases to the point where it stabilises at the limitation value defined by the Zener diode 39 in parallel with the gate-source junction. Because of this, conduction of the transistors 36, corresponding to the closing of the heating interrupters 34, is not dependent on a control commutation, thus avoiding the destructive situation described in FIG. 7. In the variant of FIG. 2, each heating interrupter 34 comprises a MOS depletion transistor, having a drain-source section serving as path for the heating current.

In the embodiment of FIG. 5, the means 70 for activation of opening of the heating interrupter 34 comprise an optoelectronic coupler or opto-coupler, comprising a photodetector 71 connected to the control input 61 of the heating interrupter 34 and an optical source 72 connected via a resistor 77 to a control input 73, in turn connected to the calculator 28 by an appropriate circuit. In the embodiment of FIG. 5, the photodetector 71 is a NPN-type phototransistor, having a collector-emitter path is connected in parallel to the gate-source section of the transistor 36 and the optical source 72 is a photodiode. When the photodiode 72 is placed in the conductive state by the control means from the input 73, the phototransistor 71 is placed in the conductive state with voltage close to zero on its collector-emitter path, this which zeroes the gate-source voltage of the heating transistor 36. The heating transistor 36 then switches to the open state, interrupting the passage of current to the heating element 33. When the photodiode 72 is not placed in the conductive state by the control means, the phototransistor 71 is placed in the non-conductive state, not modifying the functioning of the automatic closing activation means.

FIG. 9 is a variant of FIG. 5. In FIG. 9, the means 70 for activation of opening of the heating interrupter 34 comprise an interrupter 74 having a current interruption/conduction path connected in parallel of the series circuit formed by the gate-source section of the heating transistor 36 and the interrupter 53, and having a control terminal 76 serving as opening control input. The interrupter 74 is for example formed by a bipolar transistor, having a current interruption/conduction path which is formed by the collector-emitter section. A resistor 75 connected to the gate 61 of the transistor 36 guides current to the transistor 74. The transistor 74 is for example of NPN type, having a collector connected to the gate 61 of the transistor 36 and having an emitter connected to the side of the interrupter 53, other than the side connected to the charging terminal 21 connected to the source of the transistor 36. The transistor 74 can therefore be active only when the interrupter 53 is closed. This prevents a command causing the opening of the heating interrupter 34 when the interrupter 53 is open, and thus solves the above-mentioned problem of deactivation of a heating element 33, as mentioned in reference to FIG. 7. When, with the interrupter 53 closed, the transistor 74 is placed in the conductive state by control of its terminal 76, its collector-emitter voltage goes close to zero, which cause switching to the open state of the transistor 36 via the input 61. On the contrary, when the transistor 74 is left in the non-conductive state, it does not short-circuit the control input 61 of the transistor 36. Of course, any other type of transistor 76 could be utilised.

The method for charging the cells proceeds as follows for example, as is described in FIG. 8. During a previous first heating phase, the control means initially keep the interruption means 53, 54 in an opening position, for disconnecting the cells 10 from the charging terminals 21, 22 during step E1. The module is then in four-point mode, in which the use terminals 23, 24 are disconnected from the charging terminals 21, 22.

The user then connects an external charger by any appropriate means to the two charging terminals 21, 22, to apply heating voltage thereto. This heating voltage applied by the charger to the charging terminals 21, 22 starts up by growing from zero volts to a maximal preset value. The heating interrupters 34 are then in position to allow a heating current to flow to the heating element or elements 33.

When the voltage between the charging terminals 21, 22 exceeds a predetermined threshold, which is situated between zero volts and the maximal preset value, the module 51 detects that the charger is present and sends the charger detection signal via the output 52 to the calculator 28. The heating voltage applied to the charging terminals 21, 22 causes a current to flow in the heating elements 33, thus increasing the temperature of the cells 10. Due to the disconnection between the terminals 23, 24 connected to the cells and the charging terminals 21, 22 by means of the interruption means 53, 54, the voltage of the charger does not cause any charge current to flow from the charger to the cells 10, thus avoiding cold charging.

In step E2 following step E1, the calculator 28 monitors the temperature T1 and/or T2 measured by the unit 26 and/or 27 over time. When the calculator 28 determines that the temperature T of the module, which is this temperature T1 or T2, or the minimum temperature of the temperature-measuring units, reaches a predetermined value Tc authorizing the charging, at step E3 the calculator 28 commands by means of the actuator 55 each interrupter 53, 54 to go from the interruption position to the closing position, in a second charging phase succeeding the first heating phase. This predetermined charging authorisation temperature value Tc equals the nominal operating charging temperature, equal to 90° C. in the example indicated hereinabove.

The voltage of the charger, applied to the terminals 21, 22, is then transmitted via the closed interruption means 53, 54 to the terminals 23, 24 of the cells 10 to charge the latter. The cells 10 thus receive from the charger a charging current by means of the terminals 21, 22, the closed interruption means 53, 54 and the terminals 23, 24. The module is then said to be in two-point mode. The calculator 28 commands the heating interrupters 34 to open and to close during the second charging phase of the cells 10. These commands are made as a function of a temperature-managing algorithm of the cells, for example to maintain the temperature(s) T1 and/or T2 measured by the units 26, 27 above a minimal preset charging temperature of the cells.

Figure 8:
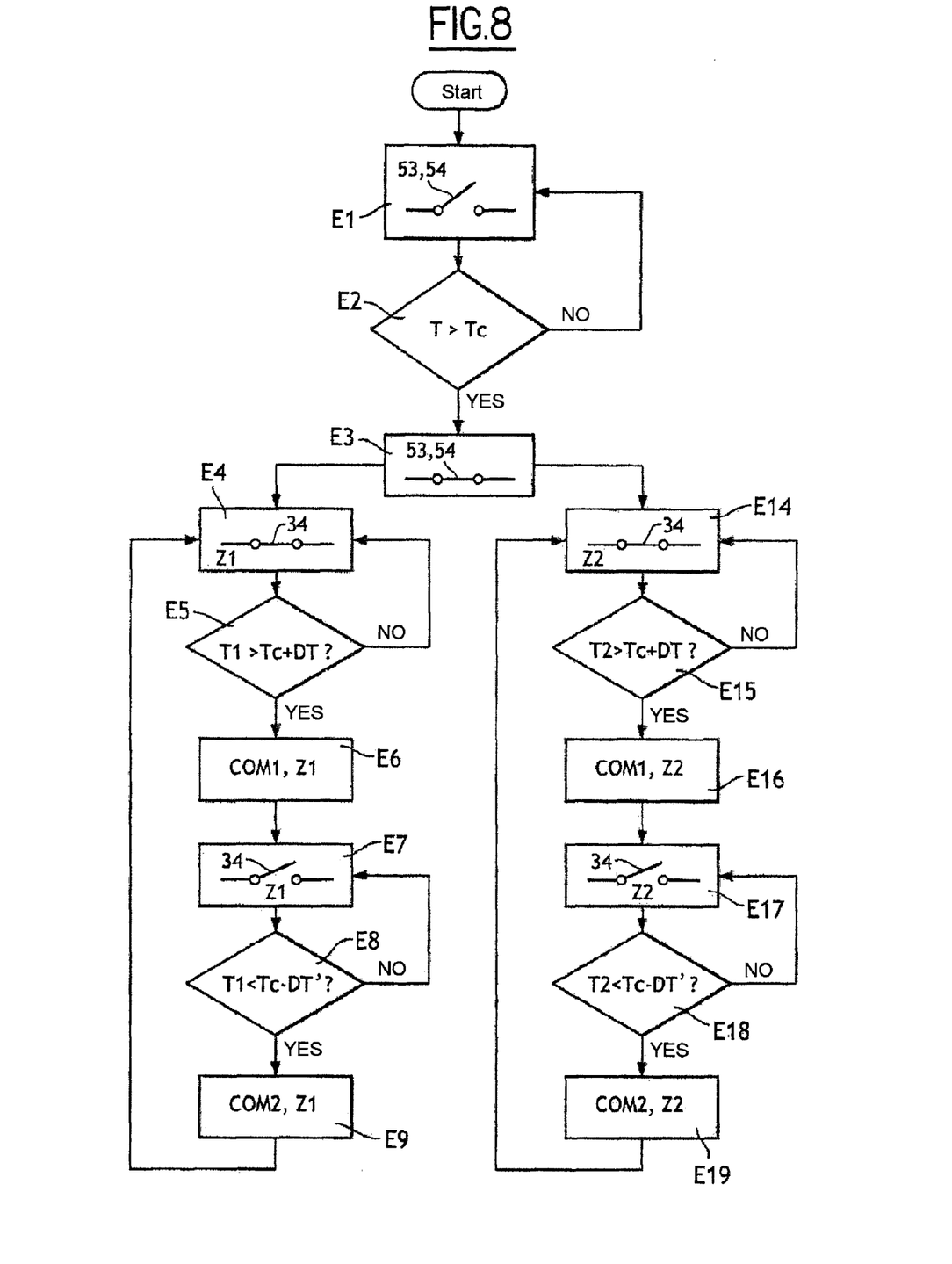
FIG. 8 is an organigram of a process for charging a module according to the invention.

In the embodiment of FIG. 8, the heating interrupters 34 of the heating elements 33 are again in closing position after the initial heating phase, in steps E4 and E14, each following step E3. FIG. 8 illustrates to the left steps E4, E5, E6, E7, E8, E9 executed by the heating interrupters 33 of a first zone Z1 of the module, such as for example the wall zone, and to the right steps E14, E15, E16, E17, E18, E19 executed by the heating interrupters 33 of a second zone Z2 of the module, such as for example the central zone. Steps E4, E5, E6, E7, E8, E9 for the temperature T1 of the first zone are described hereinbelow, given that steps E14, E15, E16, E17, E18, E19 for the temperature T2 of the second zone are similar to steps E4, E5, E6, E7, E8, E9.

After step E4, the calculator 28 tests at step E5 whether the measured temperature T1 is greater by more than one increment DT than the nominal operating charging temperature Tc. In the negative at step E5, this returns to step E4. In the affirmative at step E5, the calculator 28 sends at step E6 an opening control signal COM1 to the activation means 70 associated with the heating elements 33 of the first zone. Opening of the associated heating interrupters 34 follows at step E7, stopping flow of current to the heating elements 33 of the first zone.

Next, at step E8, the calculator 28 tests whether the measured temperature T1 is less by more than one increment DT' than the nominal operating charging temperature Tc. In the negative at step E8, this returns to step E7. In the affirmative at step E8, at step E9 the calculator 28 sends a closing control signal COM2 to the activation means 37, 38 associated with the heating elements 33 of the first zone, due to the fact that it is no longer sending an opening control signal to the means 70. The process returns to step E4 closing the associated heating interrupters 34, causing a current to flow in the heating elements 33 of the first zone.

In another embodiment, the opening and closing episodes of the heating interrupters 34 are cyclic, with a predetermined period. In the above, when in charging phase the heating elements 33 are activated by closing of their interrupter 34 or inactivated by opening of their interrupter 34, in desynchronised manner to smooth out rushes of current due to heating. So, any switching of the heating interrupters, inasmuch as each module does not cope with its heating autonomy, is avoided, and the commutation phases between the two-point and four-point modes are managed rigorously to protect the interrupters from destruction.

According to the invention, a battery pack comprising several modules in series to form a battery has been formed. This battery pack is functional, in the sense that it could be installed and utilised successfully on a fully electric, motorised terrestrial motor vehicle on wheels (formed by vehicle with two front wheels and two rear wheels, whereof the total weight with the battery pack is about one tonne), that is, the traction motor drive of which is fed by power solely by this battery pack to propel two wheels of the vehicle. Also, the vehicle can be fitted with an onboard charging structure, able to evolve from a set of n chargers for n modules to a single charger for the n modules. To recharge the modules when the vehicle is idle, an external electric feed, for example a classic feed from an electric network, such as for example the 230-volt network in France, is connected to an access provided to this effect on the charging structure.

Figure 10:
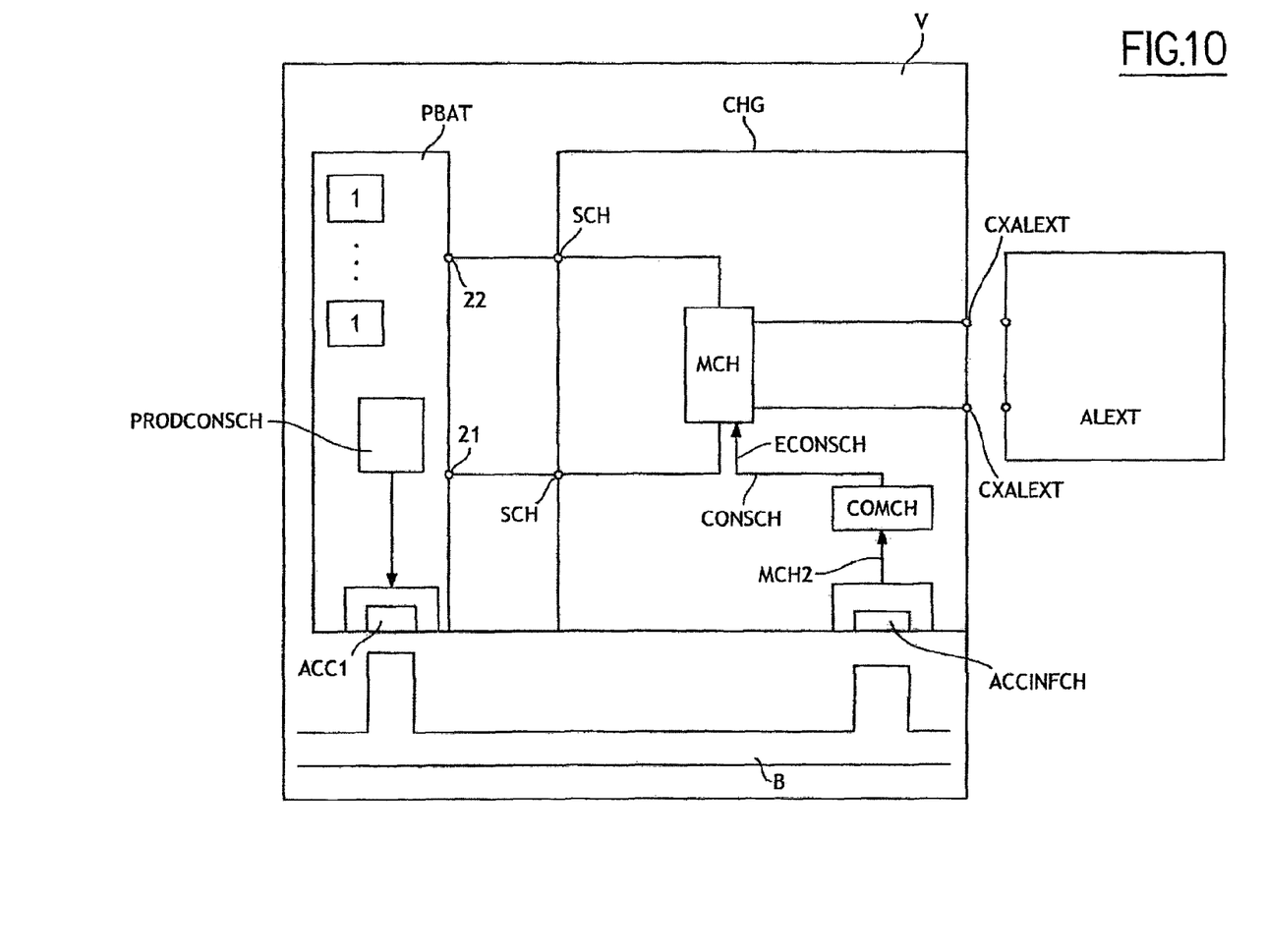
FIG. 10 schematically illustrates an embodiment of a charger installed with a pack of modules according to the invention on a motor vehicle.

In the embodiment illustrated in FIG. 10, the vehicle V comprises a pack PBAT of several modules 1, and a charging structure having at least one charger (CHG) for charging the battery modules, the charger (CHG) comprising:
at least one connection access (CXALEXT) for connection of the charger (CHG) to an external electric feed,
output terminals (SCH) connected electrically to the charging terminals (21, 22) of the modules,
means (MCH) for electric power charging of the cells from the external electric feed (ALEXT), the charging means (MCH) being connected to the output terminals (SCH).

According to an embodiment, the charger (CHG) comprises:
a second communication access (ACCINFCH) for communication with the exterior of the charger, wherein the second communication access is able to receive at least one message (MCH2) containing the quantitative charging setpoint (CONSCH),
automatic control means (COMCH) connected to the second communication access (ACCINFCH) to impose on the charging means the quantitative charging setpoint (CONSCH), the charging means (MCH) being provided to charge the cells from the external electric feed (ALEXT) with electric power according to the quantitative charging setpoint (CONSCH) present on the second communication access (ACCINFCH).

The battery comprises production means (PRODCONSCH) for producing the quantitative charging setpoint (CONSCH) of the modules and a first communication access (ACC1) for communication to the outside, wherein the first communication access is connected to the second communication access (ACCINFCH) of the charger to transmit thereto the quantitative charging setpoint (CONSCH). For example, the production means (PRODCONSCH) for producing of the quantitative charging setpoint (CONSCH) of the modules is provided on one of the modules of the battery pack.

In the embodiment described hereinabove, the first and second accesses are provided to be of type bus B. The first and second accesses are connected for example by a CAN bus of the motor vehicle. In an embodiment, the connection access CXALEXT of the charger CHG to an external electric feed is formed by a simple connection to two conductors. In an embodiment, a single charger CHG is provided on the vehicle V for all the modules 1 of the battery pack PBAT, as has been described hereinabove.

The invention claimed is:

1. A power battery module, comprising:
   (a) a multiplicity of rechargeable cells having a nominal operating charging temperature, greater than 20° C., two external use terminals for using the cells and at least one electric element for heating of the cells;
   (b) a circuit for managing charging of the cells, the circuit further comprising:
      (i) two external charging terminals for charging of the cells, wherein said two external charging terminals are intended to be connected to an external charger, wherein at least one, called second charging terminal, of the two external charging terminals is distinct from the two external use terminals;

(ii) a first interruption/connector between said at least one second charging terminal and at least one of the use terminals, called first use terminal;

the first interruption/connector being able to be in one or the other of a first interruption position to prevent the flow of current between the second charging terminal and the first use terminal, and of a second connection position for connecting the second charging terminal and the first use terminal; and (iii) a device between the charging terminals and the heating element to connect, at least in the first interruption position of the first interruption/connector, the charging terminals to the heating element to supply the heating element with electricity.

2. The battery module as claimed in claim 1, wherein the two charging terminals are second charging terminals, distinct from the use terminals, called first use terminals, the first interruption/connector being provided between the second terminals and the first terminals.

3. The battery module as claimed in claim 1, wherein the device comprises at least one heating interrupter, having an opening and closing control input, in series with the heating element, this series circuit being connected between the charging terminals;

the control input being connected to an opening activator comprising a control input for putting the heating interrupter in an opening position in the presence of an opening control signal on said control input; and means being provided in the module so that closing of the heating interrupter is independent from the opening activator and from the control input.

4. The battery module as claimed in claim 1, wherein the device comprises at least one heating interrupter, having an opening and closing control input, in series with the heating element, this series circuit being connected between the charging terminals;

the control input being connected to means for automatic closing activation of the heating interrupter in the presence of voltage between the charging terminals, and to an opening activator comprising a control input for putting the heating interrupter in an opening position in the presence of an opening control signal on said control input.

5. The battery module as claimed in claim 3, wherein the control input of the opening activator is opto-insulated relative to the control input of the heating interrupter.

6. The battery module as claimed in claim 3, wherein the opening activator comprises an interrupter, having a principal current interruption/conduction path which is connected in parallel to the series circuit formed by the heating interrupter and the interruption/connector and having a control terminal serving as opening control input.

7. The battery module as claimed in claim 3, wherein the means comprises elements for biasing of the control input from the charging terminals.

8. The battery module as claimed in claim 1, wherein the device comprises in series with the heating element at least one heating interrupter, having an opening and closing control input, this series circuit being connected between the charging terminals; and the control input of the heating interrupter being connected to a voltage limiter.

9. The battery module as claimed in claim 8, wherein the voltage limiter comprises at least one Zener diode.

10. The battery module as claimed in claim 3, wherein the heating interrupter comprises at least one transistor, having a principal current interruption/conduction path which is in series with the heating element and having a control terminal for controlling the principal path and serving as control input.

11. The battery module as claimed in claim 10, wherein the transistor of the heating interrupter is a MOS transistor, having a drain-source section which forms the principal current interruption/conduction path and having a gate serving as control input.

12. The battery module as claimed in claim 9, wherein the Zener diode is in parallel with the gate-source section of a MOS transistor of the heating interrupter.

13. The battery module as claimed in claim 1, wherein the device comprises, in series with the heating element between the charging terminals, at least one thermal fuse protecting against temperatures exceeding a preset temperature greater than the nominal operating charging temperature of the cells.

14. The battery module as claimed in claim 1, further comprising at least one unit for measuring the temperature in at least one zone of the module, and a controller operably controlling of the position of the first interruption/connector;

the controller being sensitive to the temperature measured by the measuring unit in order to operate the first interruption/connector into the connection position, when the minimal temperature provided by the measuring unit is greater than or equal to the nominal operating charging temperature preset to the controller.

15. The battery module as claimed in claim 1, wherein the link comprises at least one heating interrupter, having an opening and closing control input, in series with the heating element, this series circuit being connected between the charging terminals; and the module further comprises a controller connected to the control input for opening the heating interrupter only when the first interruption/connector is in the connection position.

16. The battery module as claimed in claim 14, wherein the heating element is respectively associated with the temperature-measuring unit in the zone of the module; and the controller is provided to cause, when of the first interruption/connector is in the connection position, the heating interrupter to open when the measured temperature of the associated unit becomes greater than a first preset temperature, greater than the nominal operating charging temperature, and to cause the heating interrupter to close when the measured temperature of the associated unit becomes less than a second preset temperature, less than the nominal operating charging temperature and greater than 20° C.

17. The battery module as claimed in claim 14, further comprising a temperature-measuring unit provided in at least two different zones of the module.

18. The battery module as claimed in claim 1, wherein the cells are made by assemblies of thin films.

19. The battery module as claimed in claim 1, wherein the cells have a nominal operating charging temperature, greater than 80° C.

20. The battery module as claimed in claim 1, wherein the cells are of lithium-metal-polymer type.

21. The battery module as claimed in claim 1, further comprising means for producing of a quantitative charging setpoint and a first access for communication to the outside, able to transmit the quantitative charging setpoint.

22. A battery comprising a plurality of battery modules as claimed in claim 1, in a battery case, the modules being connected by their use terminals in the case, the battery comprising at least two use terminals, accessible outside the case and connected to the modules, and at least two charging terminals, accessible outside the case and connected to the modules.

23. The battery as claimed in claim 22, wherein the use terminals of the modules are connected successively in series in the case, one of the external use terminals is connected to the use terminal of the lowest voltage of all the modules and the other external use terminal of the battery is connected to the use terminal of the highest voltage of all the modules.

24. The battery as claimed in claim 22, wherein the charging terminals of each module are accessible outside the case.

25. The battery as claimed in claim 22, wherein the modules are connected by their charging terminals in the case, the battery comprising two charging terminals, accessible outside the case and connected to the modules.

26. The battery as claimed in claim 23, wherein the charging terminals of the modules are connected successively in series in the case, one of the external charging terminals is connected to the charging terminal of the lowest voltage of all the modules and the other external charging terminal of the battery is connected to the charging terminal of the highest voltage of all the modules.

27. The battery as claimed in claim 22, wherein the battery comprises means for producing of a quantitative charging setpoint of the modules and a first access for communication to the outside, able to transmit the quantitative charging setpoint.

28. A method for charging a battery module as claimed in claim 1, from an external charger, the method comprising:
the at least one second external charging terminal is first disconnected relative to the at least one first external use terminal distinct from the at least one second external charging terminal;
the charger is connected to the external charging terminals to apply voltage to it;
the heating element is connected to the external charging terminals to heat the cells of the module from the voltage of the charger at least to the nominal operating charging temperature during an initial heating phase; and
after the initial heating phase, the at least one first external use terminal is connected to the at least one second external charging terminal to charge the cells from the voltage of the charger.

29. The method as claimed in claim 28, wherein the two charging terminals are second charging terminals, distinct from the
use terminals, called first use terminals;
before and during the initial heating phase, the two charging terminals are disconnected relative to the use terminals, until the cells are heated to their nominal operating charging temperature; and
after the initial heating phase, the cells are charged from the voltage of the charger from the second charging terminals, by connecting the charging terminals to the use terminals.

30. The method as claimed in claim 28, further comprising:
at least one measuring unit provided in at least one zone of the module measures the temperature; and
a calculator of the module, connected to the measuring unit, monitors the measured temperature of the cells and cause the connection of the at least one first external use terminal to the at least one second external charging terminal when the minimal measured temperature is greater than or equal to the nominal operating charging temperature.

31. The method as claimed in claim 28, further comprising:
at least one heating interrupter, comprising an opening and closing control input, is in series with the heating element, this series circuit being connected between the two external charging terminals;
the heating interrupter is automatically closed in the presence of the voltage of the charger on the external charging terminals during the initial heating phase; and
a calculator of the module controls the control input to at least temporarily cause opening of the heating interrupter only when the charging terminals are connected to the use terminals.

32. The method as claimed in claim 30, wherein the heating element is respectively associated with the temperature-measuring unit in said zone of the module; and
when the charging terminals are connected to the use terminals, the calculator controls the control input to cause opening of the heating interrupter when the measured temperature of the associated unit becomes greater than a first preset temperature, greater than the nominal operating charging temperature, and to cause the closing of the heating interrupter when the measured temperature of the associated unit becomes less than a second preset temperature, less than the nominal operating charging temperature and greater than 20° C.

33. The method as claimed in claim 30, further comprising providing a temperature-measuring unit in at least two different zones of the module.

34. The method as claimed in claim 28, further comprising housing the battery module in a motor vehicle.

35. A motor vehicle, comprising a traction motor drive and at least one battery as claimed in claim 22, for at least temporarily supplying the traction motor drive with electric power.

36. The motor vehicle as claimed in claim 35, further comprising a charging structure having at least one charger for charging the battery modules, the charger further comprising:
at least one connection access for connection of the charger to an external electric feed;
output terminals connected electrically to the charging terminals of the modules; and
a charger for electric power charging of the cells from the external electric feed, the charger being connected to the output terminals.

37. The motor vehicle as claimed in claim 36, wherein the charger further comprises:
a second communication access for communication with the exterior of the charger, able to receive at least one message containing the quantitative charging setpoint; and
automatic control means connected to the second communication access for imposing on the charger the quantitative charging setpoint, the charger being provided to charge the cells from the external electric feed with electric power according to the quantitative charging setpoint present on the second communication access.

38. The motor vehicle as claimed in claim 37, wherein the battery comprises production means for producing of a quantitative charging setpoint of the modules and a first communication access for communication to the outside, wherein the first communication access is connected to the second communication access of the charger to transmit thereto the quantitative charging setpoint.

* * * * *